June 3, 1958     G. J. KLEIN ET AL     2,837,172
CENTRIFUGAL SEPARATOR
Filed Sept. 15, 1955     3 Sheets-Sheet 1
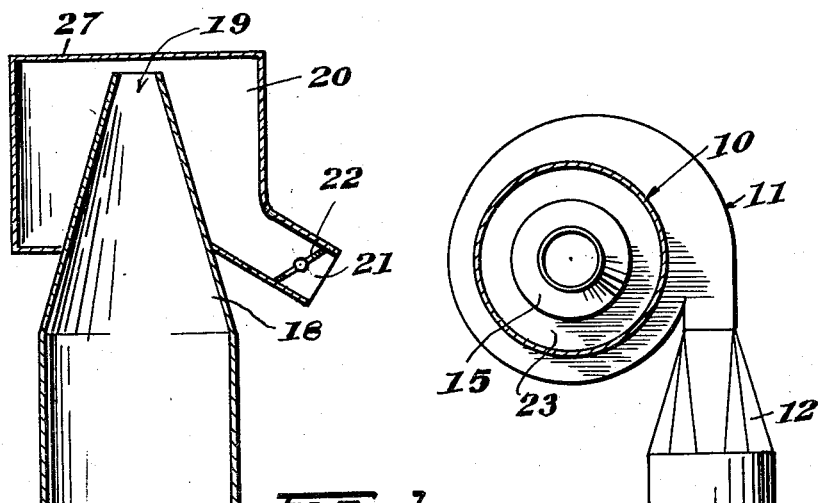
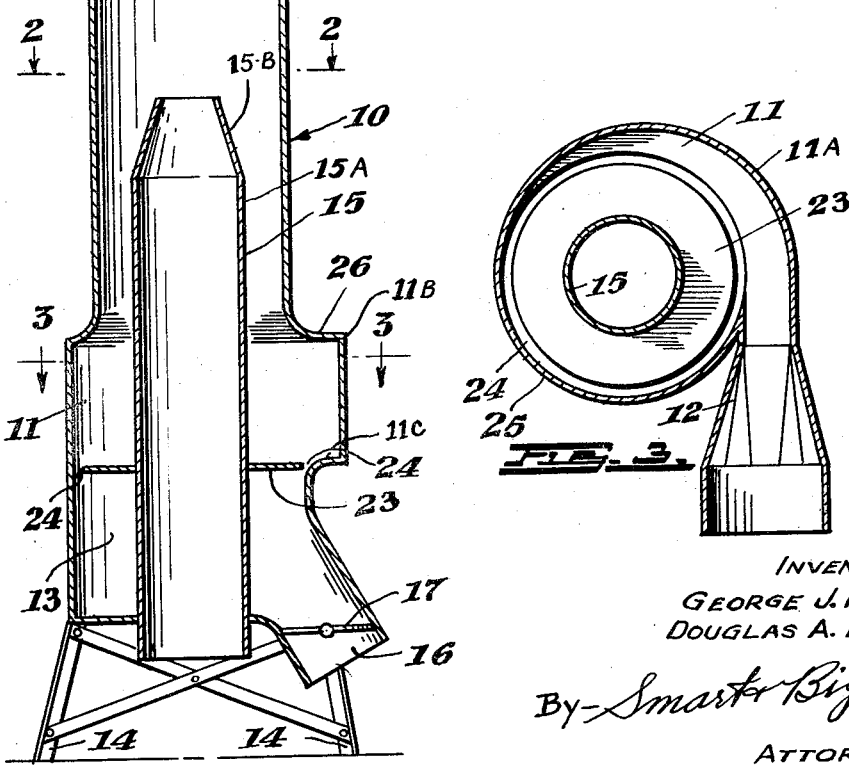
INVENTORS
GEORGE J. KLEIN &
DOUGLAS A. BAKER.
By—Smart & Biggar.
ATTORNEYS

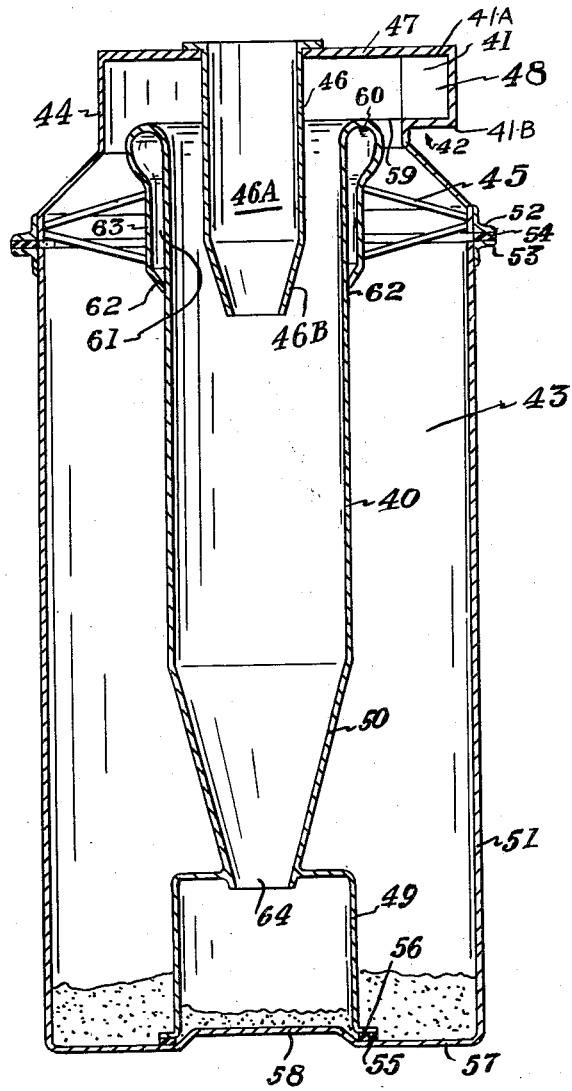

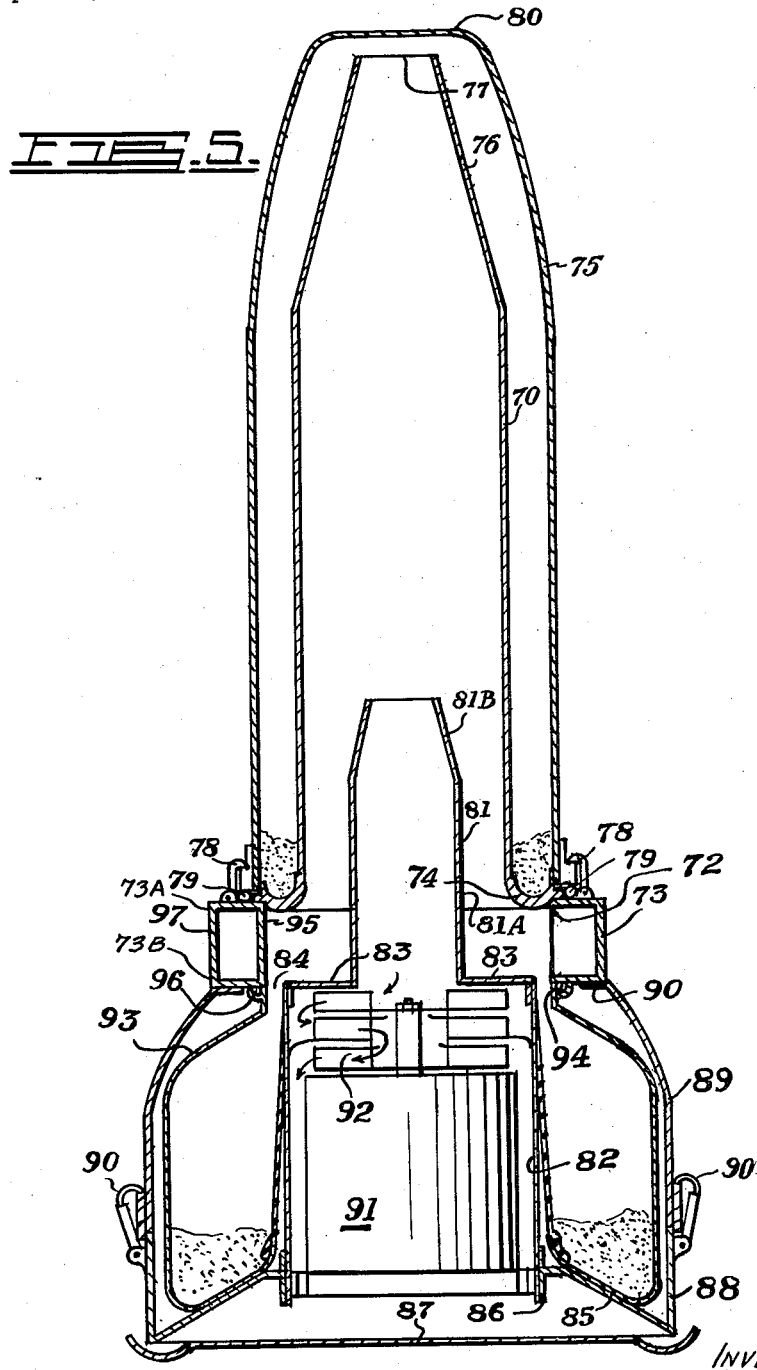

United States Patent Office 2,837,172
Patented June 3, 1958

2,837,172
CENTRIFUGAL SEPARATOR

George Johann Klein and Douglas Arthur Baker, Ottawa, Ontario, Canada, assignors to National Research Council, Ottawa, Ontario, Canada, a body corporate Application September 15, 1955, Serial No. 534,632

6 Claims. (Cl. 183—84)

This invention relates to the separation of undesired particles such as dust from fluid suspensions which are usually suspensions of particles in gases (which term as used herein includes vapours), but may be in liquids such as pulp stock, that are not too viscous, by means of centrifugal or vortex type separators which are usually described as cyclone separators, and this application is a continuation-in-part of application Serial No. 343,544 now abandoned. In the known separators of this type, the gas suspension is introduced near the top of a cylindrical body which is closed at the bottom and is provided with a baffled central clean fluid outlet at the top. The spinning air follows a helical path throwing suspended particles outwardly and eventually reversing the vertical direction of flow while maintaining the same direction of rotation so as to pass upwardly centrally of the body toward the central outlet, while the suspended particles are collected in the lower regions of the cylindrical body.

Many proposals have been made directed to improving the efficiency of the cyclone type of separator, and important advances have been made. Thus it is recognized that the cylindrical body of the separator must be of sufficient length to allow centrifugal force to bring suspended particles to the wall of the separator body, and the diameter must be relatively small in relation to the length of the body because the centrifugal force on the suspended particles is greater when the radius is made small. Further it is recognized that it is not sufficient to provide a cylindrical body of such length that the vortical action takes place only in the upper region with the intention that suspended particles reaching the cylindrical wall of the body will fall by gravity to a lower region where they will not be picked up by the vortex, but that an arrangement must be made whereby downward movement of the particles in a helical path is not discontinued, when most of the fluid reverses the direction of flow and moves upward centrally of the body to the outlet duct, but is caused to continue in the original direction to a point where it is clear of the vortex and may be collected. Thus it has been proposed to provide at the bottom of the cylindrical body a conical section leading to a dust hopper and tapering to an opening of such diameter that the portion of the fluid in which the particles are concentrated is caused to continue in its helical path and to pass through the opening while the remainder of the gas moves upwardly to the outlet duct.

By these and other means and by precise proportioning off the parts, great advances have been made, but the known separators are subject to the serious disadvantage that they fail adequately to separte a high concentration of suspended particles, particularly if a fluid of high particle concentration is presented to the separator suddenly as a result, for example, of the sudden release of an accumulation of particles. For this reason it has not heretofore been possible to use vortex type separators in any application such as in vacuum cleaners, for example, where there may be a high concentration of suspended particles, particularly when the particle concentration is irregular and the high concentration of particles is presented suddenly as when a vacuum cleaner is used to pick up spilled flour, for example. The separation of dust and other particles is presently effected in vacuum cleaners by passing the laden air through a porous bag in which the entrained particles are collected. Such porous bags prevent the passage of a high proportion of entrained particles, both large and small, but as the bag fills up, the passage of the air through the bag becomes more and more difficult and the effectiveness of the vacuum cleaner drops accordingly. It is, therefore, important that the bag be emptied frequently and this is a serious disadvantage because it has been found that in practice the porous bags are not emptied frequently.

The object of the present invention is therefore to improve the efficiency of vortex type separators and more specifically to improve the efficiency of such separators for the handling of a high concentration of suspended particles.

A further specific object of the invention is to provide a vortex type separator capable of separating particles from a fluid, particularly a gas with high efficiency even when the particle concentration is irregular and gas of high particle concentration is presented to the separator suddenly.

With these and other objects in view, there is provided according to the invention a separator in which a large proportion of the suspended particles is eliminated in what is in effect a preliminary separation in association with the inlet scroll chamber, without, however, appreciably increasing the pressure drop over that of a single stage separator conforming substantially to stage two of the separator according to the invention. Thus the separator according to the invention comprises a substantially cylindrical separator body, a fluid inlet adjacent one end thereof including a scroll chamber for the tangential introduction to the body of a suspension of particles to be separated, a section at the other end of the cylindrical body terminating in an opening of smaller diameter than that of the separator body, a second stage hopper surrounding and enclosing the said opening, a first stage hopper adapted to cooperate with the scroll chamber, a clean fluid outlet duct positioned substantially centrally of the separator body and extending from a point within the substantially cylindrical separator body through the scroll chamber, and means defining a narrow at least part annular passage between the scroll chamber and the first stage hopper adjacent at least part of the lateral wall of the scroll chamber, said passage being spaced farther from the longitudinal axis of the separator than is the wall of the separator body, and the scroll chamber communicating directly both with the separator body and said passage whereby part of the particle carrying fluid passes directly from the scroll chamber to the separator body while another part passes from the separator body through said passage and returns through said passage to enter the separator body. It is preferred that the separator body be relatively long in relation to its diameter and that the section at the end thereof be conical and likewise be relatively long in relation to its maximum diameter. It is also preferred that the scroll chamber terminate at a point spaced outwardly of said projection of the wall of the body sufficiently to accommodate said narrow passage, and that the narrow passage form a complete annulus.

Other features of the invention appear from the following description with reference to the accompanying drawings, in which Figure 1 is a vertical section of an embodiment of a separator according to the invention which is inverted by comparison with the usual vortex type separators, the inlet scroll being at the bottom of the cylindrical body.

Figure 2 is a section on the line 2—2 of Figure 1.

Figure 3 is a section on the line 3—3 of Figure 1.

Figure 4 is a vertical section of an embodiment of the invention designed normally to be operated with the conical end of the separator body below the scroll end, the arrangement being such that both hoppers are emptied in one operation.

Figure 5 is a vertical section of a separator of the type illustrated in Figure 1 in the form of a vacuum cleaner.

Referring to the embodiment illustrated in Figure 1, the separator body 10 is cylindrical and it is relatively long in relation to its diameter. At its lower end the separator body 10 is provided with a gas inlet arrangement including a scroll chamber 11 having a nozzle 12 and below the scroll chamber 11 is a casing forming a hopper 13 to which are affixed legs 14 by means of which the apparatus as a whole is raised from the ground and suitably supported.

The scroll chamber has an outer wall 11A which is curved in the manner shown in Fig. 3. This outer wall has upper and lower side edges as shown at 11B and 11C in Fig. 1 and these side edges define parallel planes disposed normally with respect to the axis of the separator.

A clean gas outlet duct 15 is positioned centrally of the body 10 at the lower end and it extends downwardly through the centre of the scroll chamber 11 and the centre of the hopper 12 to open onto the space below the hopper. Particles collected in the hopper 13 may be removed by means of an outlet 16 normally closed by means such, for example, as a butterfly valve 17.

At the upper end of the cylindrical body 10, there is provided a conical extension 18 which is relatively long in relation to its maximum diameter and terminates in an opening 19 which is of small diameter in relation to that of the separator body and is surrounded and enclosed by a casing forming a hopper 20, which like the hopper 13, is provided with a particle outlet 21 and a valve 22.

Extending outwardly from the gas outlet duct 15, at the level of the bottom of the scroll chamber 11, is a plate 23 in the form of a disc which forms part of the bottom wall of the scroll chamber and which projects outwardly beyond the projection of the cylindrical wall of the body 10, but is spaced from the side wall of the scroll chamber so as to define a passage 24 from the scroll chamber to the hopper 13 which is shown as annular but may be part annular and is spaced outwardly from the gas outlet duct 15 such a distance that it is outward of the projection of the cylindrical wall of the body 10. In the embodiment illustrated, the hopper 13 is cylindrical and substantially one half of the scroll chamber 11, indicated by reference numeral 25, as seen in Figure 3 is part cylindrical and, further, the radius of the hopper is equal to that of the half 25 of the outer wall 11A of the scroll chamber which is part cylindrical and therefore is of uniform curvature. Thus, the outer wall of hopper 13 forms a smooth continuation of a portion of the outer wall of the scroll chamber. It will be understood, however, that the hopper 13 may be of any shape and may be of any extent in cross-section so long as it lies below and is of greater diameter than the passage 24 which, as noted, is outward of the projection of the cylindrical body 10, so that gas passing downward through the passage 24 is not obstructed by any part of the hopper 13, and provided further that its shape and size is such that it permits adequate spin of the gas within it to allow the hopper to function as an effective dust trap.

As is described below, the scroll of the scroll chamber 11 preferably terminates at a point spaced outwardly from the wall of the body 10. In the embodiment illustrated it is so spaced outwardly that the passage 24 may form a complete annulus. It is, however, within the contemplation of the invention that the passage be part annular. In any event, the passage 24 should be narrow by which is meant narrow in relation to the diameter of the separator body. The size should be adjusted so that it passes particles of the size and concentration to be dealt with while not exceeding about 0.20 times the diameter of body 10. The greater the size of the opening, the greater is the volume of gas entering hopper 13 with a consequent increase in the problem of maintaining an effective dust trap. On the other hand too small a passage tends to overload the second stage of separation and a minimum of about 0.05 times the diameter of the body 10 should be observed. In the embodiment of Figure 1 it is preferred that the width of the passage 24 be about 0.07 times the diameter of the body 10. The first stage of separation according to the invention begins with a concentration of particles in a relatively thin layer of gas adjacent the wall of the scroll chamber 11. Part of the thin layer of gas in which the particles are thus concentrated passes down into the hopper 13 and tests which have been carried out show better than 80% of the suspended particles removed in this stage of separation. The gas which enters hopper 13 is returned to the scroll by flowing upward adjacent to the edge of the plate 23 and, together with the remainder of the gas is then contracted into the body 10 and the second stage of the separator is enabled to work on as little as 20% of the suspended material. Thus the preferred form of separator as a whole achieves so high an efficiency that it is difficult to measure it accurately when, for example, separating wood flour ranging in particle size from 50 to 5 microns.

The precise basis on which so large a percentage of the suspended material is separated in the initial stage of the separator is not certain. It is clear, however, that centrifugal force concentrates the suspended particles in a thin layer of gas next to the wall of the scroll chamber 11 and outside the projection of the wall of the body 10. It will be apparent that as the gas is pressed against the inside wall of the scroll chamber 11 it will seek to go both up and down and in going down it passes through the passage 24. In going up, it encounters the dust trap formed by the shoulder 26 by which the scroll chamber 11 is faired into the body 10 as described below, and when the air moves into the body 10, the particles carried by it are largely trapped by shoulder 26 and eventually find their way down the wall 11 to the passage 24. It is believed that the gas passing through the passage 24 initially stays close to the wall of hopper 13 and then curves inwardly toward the central area of lower pressure leaving the greater part of the suspended particles concentrated at the wall of the hopper 13. The relatively clean gas then passes upwardly through the passage 24 and adjacent to the edge of plate 23. The general arrangement of the scroll 11, hopper 13 and plate 23 acts as an effective dust trap.

While the particles are concentrated in a thin layer of gas at the wall of the scroll chamber 11 and a part of this thin layer passes down into the hopper 13, the bulk of the gas is contracted into the body 10 and thus enters the second stage of separation according to the invention. In known manner this gas follows a helical path upwardly within the body 10 until the greater part of it is turned back by the conical section 18 and moves to the centre of the body 10 and downwardly through the clean gas outlet duct 15 while the remainder of the gas, which is a thin layer at the wall of the body 10 in which is concentrated the greater part of such of the suspended materal as has passed to the body 10, continues its helical path upwardly adjacent to the wall of the conical section 18 to the opening 19 where the particles are flung outwardly into the hopper 20.

As mentioned above, the body 10 is relatively long in relation to its diameter and is provided at the upper end with a relatively long conical section terminating in an opening of small diameter in relation to that of the separator body. It is preferred that in known manner the length of the body 10 be approximately three times the diameter of the body and that the conical section be approximately half as long as the body 10. Further, it is advantageous that the opening 19 into the hopper 20 be approximately one-third of the diameter of the body 10, that the construction and proportions of the gas outlet duct, and the proportions of the inlet scroll chamber be as indicated below, and that the entrance from the scroll chamber 11 to the body 10 be faired by the rounding of the shoulder 26. The scroll chamber 11 is larger in diameter than the cylindrical body 10, as has been seen above, and moreover the scroll terminates outside the projection of the cylindrical body 10 so that a vortex is formed in the scroll chamber before the spinning stream of gas is contracted into the body 10. Thus there is obtained a flow which is as nearly symmetrical about the axis of the body 10 as possible. The result is to minimize turbulence. To the same end the shoulder 26 is gradually curved as mentioned above. With regard to the gas outlet duct which is closely concentric with the body 10, the best results are obtained if the duct consists of a cylindrical section 15A and a conical section 15B, and the diameter of the section 15A is from about 0.55 to about 0.6 times the diameter of the body 10 and projects into the body 10 above the scroll 11 a distance approximately 0.6 times the diameter of the body 10, and the conical section 15B has a length between about 0.4 and 0.45 times the diameter of the separator body 10 with an opening at its upper end which is close to one-third the diameter of the body 10.

The gas which carries particles through the opening 19 until they are separated by centrifugal force curves back and moves inwardly adjacent to the baffle 27 and then downwardly centrally of the opening 19. As illustrated in Figure 1, the hopper 20 surrounds the opening 19 and in this embodiment the section 18 advantageously projects well into the hopper 20 so that the separated particles fall away from the area of high air speed near the opening 19 and there is adequate storage space for particles to collect without fouling the opening 19. Preferably, as illustrated, the conical section 18 extends to a point very close to a baffle member which may be the end wall 27 of the hopper 20. The baffle turns back into the opening 19 the small amount of air which has carried the suspended particles into the hopper 20 so that it moves only slightly radially outwardly of the opening 19 before turning back to the opening. It has been found that with this construction the effect of this small amount of air, which is still spinning at high speed, in causing the air in the hopper 20 to spin is minimized and it has been found that the space between the end of the conical section 18 and the baffle should be approximately 0.06 times the diameter of the body 10 for the best results. The baffle, as noted, may be the end wall 27. Alternatively a separate baffle may be suspended from the end wall of the hopper, which is then spaced farther from the opening 19, and the baffle may to advantage be mounted for free rotation on a central shaft. When the baffle is so made rotatable, its frictional resistance to the air emerging in a helical path from the opening 19 is reduced, and moreover the baffle is rotated at a speed capable of assisting in throwing outwardly such particles as strike it.

Referring now to the embodiment illustrated in Figure 4, there is shown an arrangement permitting both hoppers to be emptied in one operation, both hoppers being on the same side of the scroll chamber. In all embodiments of the invention, the scroll chamber should not be below the hopper of the first stage of separation. In normal operation the separators will be upright or approximately so, but will operate at a substantial angle to the vertical, and even horizontal. Accordingly the scroll chamber is arranged at the top of the separator body as viewed in the upright position in Figure 4. This scroll chamber has an outer wall with upper and lower side edges 41A and 41B which define parallel planes perpendicular to the axis of the separator body. It can be seen that in this embodiment the inlets to both the first and second stages are located in the same plane whereas in the Fig. 1 embodiment each inlet is located in one of the two planes defined. In the illustrated arrangement, the separator body indicated by the reference numeral 40 is not connected directly at its top edge to the scroll chamber 41 which is open at its lower side 42 to provide for passage of particles from the scroll chamber 41 into the first stage hopper 43. Accordingly the wall 44 of the scroll chamber is extended outwardly and downwardly to surround the upper end of the separator body 40 and the latter is supported within the housing formed by this outwardly and downwardly extended wall by rods 45 or other suitable means providing minimum interference to the flow of air and dust. Thus it can be seen that the inlet to the first hopper forms a smooth continuation of a portion of the outer wall of the scroll chamber. The rods 45 are suitably arranged in the manner of bicycle spokes. As in the embodiment illustrated in Figures 1 to 3, the clean air outlet duct 46 is positioned centrally of the body 40 and it extends from a point within the body 40 through the scroll chamber 41 to open on to the space outside the scroll chamber or, as viewed in Figure 4, above it. It will be understood that a housing carrying a motor and fan may be mounted on the face 47 of the scroll chamber to draw air through the separator, where, for example, it is desired to use the separator in the form of a vacuum cleaner, the usual tube or hose then being connected to the inlet 48. At the end of the separator body 40 opposite the scroll chamber, it is provided with a second stage hopper 49 surrounding and enclosing the conical end 50 of the separator body 40, as illustrated. The hopper 43 is bounded and the hopper 49 closed by casing 51 so that on removal of the casing 51, on detaching toggle clamps (not shown) engaging flanges 52 and 53 for example, both hoppers may be emptied in one operation. A sealing ring 54 is arranged between the flanges 52 and 53 and a sealing ring 55 is likewise provided between the flange 56 of the hopper 49 and the bottom wall 57 of the hopper 43 to prevent any significant secondary flow. As illustrated, the bottom wall 57 of the hopper 43 may conveniently be provided with an indentation 58 adapted to cooperate with the walls of the hopper 49 to aid in centering the separator body 40 and hopper 49 in the mounting of the casing 51. If desired a wall may be provided projecting from the wall of the hopper 49 upwardly to the main wall of body 40 to avoid the lodging of dust on the top of hopper 49. It will be understood that the entire casing 51 need not be removable, it being sufficient for the emptying of the two hoppers in one operation, that the bottom wall of casing 51 be removable.

As the gas (air in the case of a vacuum cleaner), enters the scroll chamber, the separation of particles proceeds as described above with reference to Figures 1 to 3, the first stage separation resulting in a very high proportion of suspended particles and usually all of the larger particles being collected in the hopper 43 while the remainder of the particles are collected in the hopper 49. As in the embodiment illustrated in Figures 1 to 3, the passages 59 through which the thin layer of gas carries suspended particles to the hopper 43, is positioned outwardly of the wall of the separator body. The size of the passage 59 should be adjusted on the basis indicated above with respect to Figure 1, the preferred size in the particular embodiment illustrated in Figure 4, which is suitable for use as a vacuum cleaner, being approximately 0.10 times the diameter of the separator body. As described above in connection with Figure 1, it is believed that the gas passing through the passage 59 of Figure 4 stays close to the wall of the hopper 43 and then curves inwardly. Because the wall 44 slopes outwardly as well as downwardly, the gas thus passes first outwardly and downwardly before passing inwardly and upwardly to leave the hopper 43 through the passage 59, and it is found that this increases the effectiveness of the hopper as a dust trap so that the increase in size of passage 59 presents no problem. In this connection it will be noted that the outer surface of the upper end of the body 40 is smoothly curved for the purpose of minimizing turbulence. As in Figure 1 the entrance to the body 40 from the scroll chamber is rounded at the shoulder 60. In the embodiment illustrated in Figure 4 the upper end of the body 40 (which is shown as terminating in the plane of the bottom of the scroll chamber, but may terminate above or below that plane) is provided with a wall section 61 continuing the curve of the shoulder 60 and secured to the wall proper of the hopper 40 at 62 so that the upper end of the wall of the body 40 is reinforced and at the same time is provided with smoothly curved outer surface 63. The gas which has thus returned from the hopper 43, together with a proportion of gas which has not entered the hopper 43, then passes around the shoulder 60 and is contracted into the body 40 where it enters the second stage of separation according to the invention. The gas then follows its helical path downwardly until the greater part of it is turned back by the conical section 50 and moves to the centre of the body 40 and upwardly through the clean gas outlet duct 46. The remainder of the gas passes in a thin layer down the wall of the section 50 until it enters hopper 49 through opening 64 and the particles which it carries are deposited by centrifugal action in the hopper 49. Because the hopper 49 is normally at the bottom of the device, the conical section 50 does not project far into it as does the conical section 18 into the hopper 20 of Figure 1. Otherwise this second stage hopper corresponds to that of Figure 1. It is larger in diameter than the opening 64 which means that the clean gas returning to the opening 64 must pass a shoulder which may be horizontal as illustrated or may be sloped where at least the upper part of the hopper is conical in shape. Furthermore, the hopper 49 is generally circular in shape so that the spin of the gas is not disturbed. The diameter is preferably from about three-quarters to one and one-half times the diameter of the body 40. As in Figure 1 the clean gas outlet duct 46 is provided with a cylindrical section 46A and a conical section 46B both of which are preferably of the proportions indicated above with reference to Figure 1.

A separator of the type illustrated in Figure 4 in which the inlet scroll is normally at the top, has the advantages when used as a vacuum cleaner that the two hoppers may be emptied in the one operation, and that the motor and fan are at the top of the device. This is an important consideration where the vacuum cleaner is used to suck up water as is occasionally the case, e. g. in the washing of floors covered with linoleum and the like.

An embodiment of the invention of the type illustrated in Figure 1 intended for use as a vacuum cleaner will now be described with reference to Figure 5. As in Figure 1, the separator body 70 is directly connected to the top wall 72 of the scroll chamber 73 and is faired into it at the shoulder 74. The second stage hopper 75 cooperating with the conical section 76 and the opening 77, conveniently surrounds the entire separator body 70 and is readily removed by loosening clamps 78. A sealing ring 79 is advantageously provided between the lower edge of the hopper 75 and the upper face 72 of the scroll chamber 73. As in Figure 1 the end 80 of the hopper 75 may be positioned close to the opening 77, the spacing being preferably that indicated above with reference to Figure 1 and the end 80 acting as a baffle in the manner described. The clean gas outlet duct 81 corresponds with its sections 81A and 81B to the clean gas outlet duct 15 of Figure 1. It is connected, however, at the lower side of the scroll chamber to the top wall of a fan and motor housing 82, the top wall 83 of which corresponds to the plate 23 of Figure 1 and is of such diameter that the passage 84 through which the air in the first stage of separation passes to the first hopper (corresponding to the passage 24 of Figure 1) is spaced outwardly of the projection of the wall of the body 70. The size of passage 84 should be adjusted as indicated above and in view of the use for which this embodiment is intended the passage 84 may correspond in size to the passage 59 of Figure 4.

The cylindrical side wall of the housing 82 is suitably connected to base member 85 by means of a cylindrical flange 86 having spaced therefrom a foot 87 so that clean air having passed through the fan and motor housing 82 and downwardly through the cylindrical opening at the bottom may pass outwardly below the base 85. The latter has an outer cylindrical flange 88 adapted for mounting of a housing 89 having at the top a flat rim 90 on which the scroll chamber 73 is mounted. The housing 89 and the scroll chamber 73 are readily attached to and detached from the base 85 by means of quick release clamps 90. A motor 91 driving a fan 92 is suitably suspended within the housing 82 by means not shown.

For convenience of emptying, the hopper of the first stage is constituted by a removable annular pail 93 positioned within the housing 89 and surrounding the motor housing 82. The centre wall of the annular pail is preferably formed of a resilient material such as rubber of such a size as snugly to engage the outer wall of the motor housing 82 as illustrated. The bottom wall of the pail rests on the base 85 and the outer wall of the pail is curved outwardly from a lip 94 aligned with the outer edge of the passage 84. A seal 96 is preferably positioned between the lip 94 and the lower face of the scroll chamber which it engages and if desired the lip 94 may be forked as illustrated to receive an O-ring seal 96. The scroll chamber 73 has an outer wall 95 with upper and lower side edges 73A and 73B which define parallel planes perpendicular to the axis of the separator body. The inlet 84 to the first stage separator lies in the plane formed by the lower side edge 73B whereas the inlet to the second stage separator lies in the plane formed by the upper side edge 73A. It can be seen that the outer wall of the hopper 93 constitutes a smooth continuation of the outer wall portion 95. For the sake of symmetry, the outer wall 95 of the scroll chamber has connected to the outside thereof over part of its circumference, a wall 97 which in effect brings out the scroll chamber throughout its circumference to the diameter of the air inlet which, as in Figure 4, is shown without the inlet nozzle which may, however, be provided in the embodiments of Figures 4 and 5, as in Figure 1.

What we claim as our invention is:

1. A two stage vortex type separator comprising a scroll chamber for the tangential introduction to the separator of a fluid suspension of particles to be separated, said scroll chamber having a curved outer wall, the side edges of said outer wall defining a pair of substantially parallel planes disposed normally with respect to the outer wall and the axis of the separator, a first stage separator having a first hopper for collecting the particles, means defining a restricted annular inlet to the first hopper having an outer wall formed as a smooth continuation of a portion of the curved outer wall of the scroll chamber, a second stage separator having a second hopper, means defining a second inlet to said second stage separator, said second stage separator having a wall spaced inwardly with respect to the outer wall of said scroll chamber, both said first and second inlets opening into said scroll chamber in at least one of said pair of parallel planes and a clean fluid outlet duct having an end extending to a point within said second stage separator.

2. A separator according to claim 1 in which the cross-sectional area of said first inlet is appreciably less than the cross-sectional area of the scroll chamber and the first hopper.

3. A separator according to claim 1 in which the width of the restricted annular inlet is from about 0.20 to about 0.05 times the diameter of the second separator.

4. A separator according to claim 1 in which the fluid outlet duct has a tapered portion on the end thereof extending into said second stage separator.

5. A two stage vortex type separator comprising a scroll chamber having a curved outer wall, the side edges of said outer wall defining a pair of substantially parallel planes, a first stage separator having a first hopper, a first inlet to said first stage separator, said first inlet having a cross-section appreciably less than the cross-section of the scroll chamber and the first hopper, the outer wall of said first hopper being formed contiguous with a portion of the curved outer wall of the scroll chamber, a second stage separator having a second hopper, a second inlet to said second stage separator, said second inlet being disposed spaced with respect to said first inlet, the wall of said second inlet being faired into the outer wall of said scroll chamber, both said first and second inlets opening into said scroll chamber in at least one of said pair of parallel planes, and a clean fluid outlet duct having an end extending to a point within said second stage separator.

6. A separator according to claim 5 in which the width of said first inlet is from about 0.20 to about 0.05 times the diameter of the second separator and the fluid outlet duct has a tapered portion on the end thereof extending into said second stage separator.

References Cited in the file of this patent

UNITED STATES PATENTS

| | | |
|---|---|---|
| 1,159,267 | Posner | Nov. 2, 1915 |
| 1,344,585 | Hewitt et al. | June 22, 1920 |
| 1,978,802 | Lissman | Oct. 30, 1934 |
| 2,067,710 | Jacobsen | Jan. 12, 1937 |
| 2,347,731 | Boivie | May 2, 1944 |
| 2,368,699 | Arnold | Feb. 6, 1945 |
| 2,432,757 | Weniger | Dec. 16, 1947 |
| 2,553,175 | Davenport et al. | May 15, 1951 |
| 2,607,438 | Bailey | Aug. 19, 1952 |

FOREIGN PATENTS

| | | |
|---|---|---|
| 73,125 | Denmark | Sept. 24, 1951 |
| 285,038 | Great Britain | May 9, 1929 |
| 615,004 | Germany | June 24, 1935 |
| 843,347 | Germany | July 7, 1952 |